United States Patent [19]
Cowsert

[11] Patent Number: 5,887,936
[45] Date of Patent: Mar. 30, 1999

[54] BACKLITE SYSTEM FOR USE IN AN AUTOMOTIVE VEHICLE CONVERTIBLE ROOF

[75] Inventor: Lendell E. Cowsert, Taylor, Mich.

[73] Assignee: ASC Incorporated, Southgate, Mich.

[21] Appl. No.: 881,699

[22] Filed: Jun. 25, 1997

[51] Int. Cl.⁶ ........................................................ B60J 7/12
[52] U.S. Cl. ................................ 296/107.07; 296/146.14
[58] Field of Search ........................... 296/107.07, 146.14

[56] References Cited

U.S. PATENT DOCUMENTS

| | | |
|---|---|---|
| 2,711,924 | 6/1955 | Orr . |
| 2,798,763 | 7/1957 | Dujic . |
| 3,188,135 | 6/1965 | Bernstein et al. . |
| 3,214,213 | 10/1965 | Hezler, Jr. et al. . |
| 3,237,983 | 3/1966 | Hollar, Jr. . |
| 3,536,354 | 10/1970 | Ingram . |
| 3,976,324 | 8/1976 | Lehmann . |
| 4,572,570 | 2/1986 | Trucco . |
| 4,611,849 | 9/1986 | Trenkler . |
| 4,693,509 | 9/1987 | Moy et al. . |
| 4,747,635 | 5/1988 | Wagner . |
| 4,778,215 | 10/1988 | Ramaciotti . |
| 4,917,432 | 4/1990 | Schrader et al. . |
| 5,002,330 | 3/1991 | Koppenstein et al. . |
| 5,219,200 | 6/1993 | Orth et al. . |
| 5,253,915 | 10/1993 | Schnader et al. . |
| 5,259,658 | 11/1993 | Koppenstein et al. . |
| 5,267,770 | 12/1993 | Orth et al. ........................ 296/107.07 |
| 5,271,655 | 12/1993 | Ball et al. . |
| 5,375,901 | 12/1994 | Agosta et al. . |

FOREIGN PATENT DOCUMENTS

| | | |
|---|---|---|
| 3726 430 C1 | 9/1988 | Germany . |
| 3727 338 C1 | 1/1989 | Germany . |
| 3835 292 A1 | 4/1990 | Germany . |
| 4129 492 A1 | 1/1993 | Germany . |
| 4438 253 C1 | 10/1995 | Germany . |
| 602226 | 5/1948 | United Kingdom . |
| 2 141 389 A | 12/1984 | United Kingdom . |

OTHER PUBLICATIONS

ASC drawing entitled "1990 Saab Convertible, Top Stack Assembly—Cover", W–63X0–4960–AXXX, Sheet No. 5, May 2, 1990.

ASC Drawing entitled "1990 Chrysler P–27 Convertible, Top Cover Assembly", W–39X0–4960–AXXX, Sheet No. 4F, May 15, 1990.

Manual of Latch Handle and Lock Assembly used in a covertible roof for the Geo metro (on or before 1992).

1973 Car Shop Manual, vol. IV Body, Ford Marketing Corp., pp. 46–04–01 through 46–04–05 (1972).

*Primary Examiner*—Joseph D. Pape
*Attorney, Agent, or Firm*—Harness, Dickey & Pierce, P.L.C.

[57] ABSTRACT

An apparatus for use in automotive vehicle convertible roofs includes an elongated tensioning member being disposed adjacent to an edge of a window. At least a portion of the tensioning member is disposed in an elastomeric sealing member. A pair of resilient tensioning members are disposed adjacent to top and bottom edges of a backlite for deterring crosscar folding of the backlite while allowing fore and aft folding of the backlite when retracted.

18 Claims, 3 Drawing Sheets

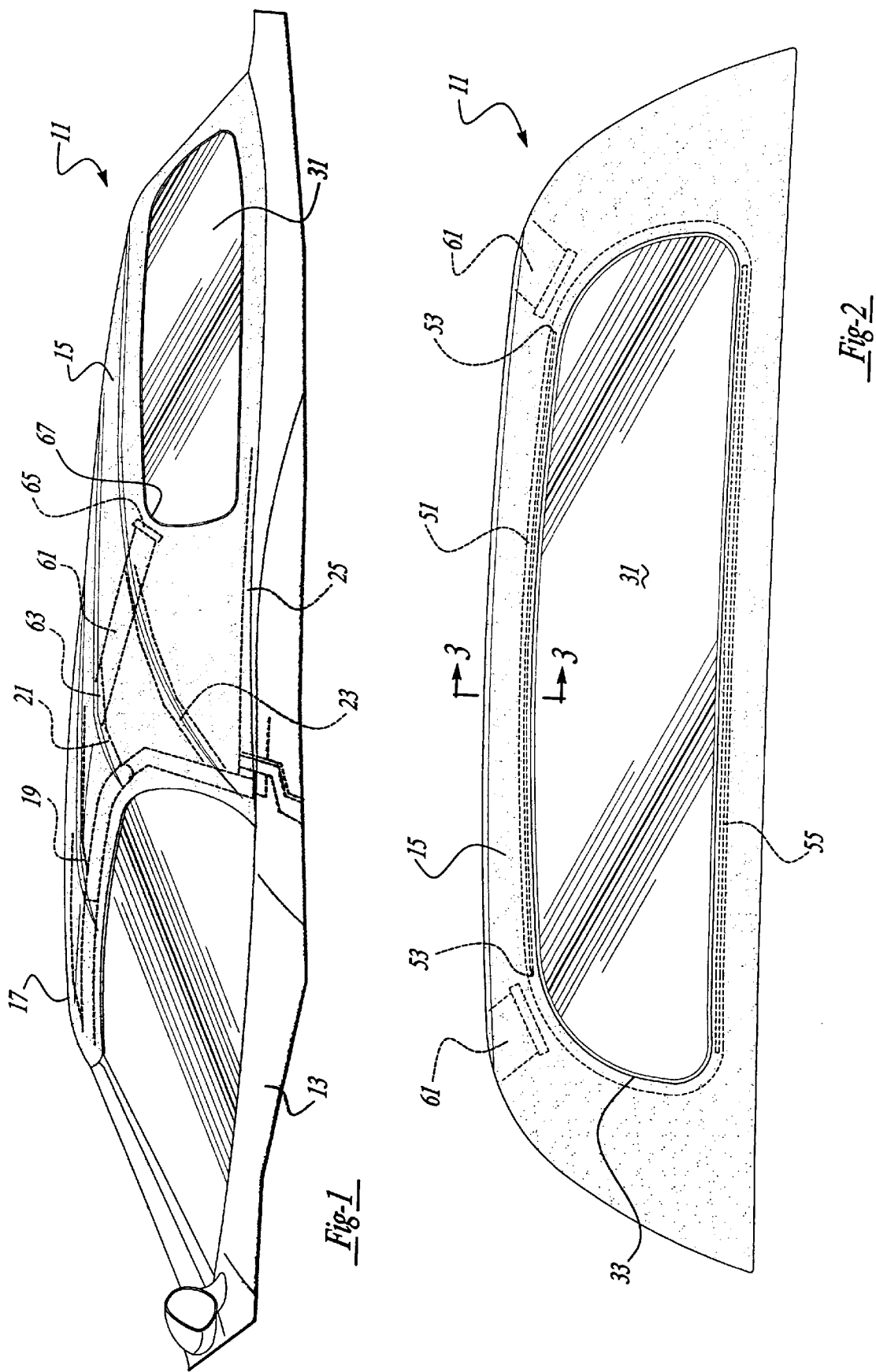

BACKLITE SYSTEM FOR USE IN AN AUTOMOTIVE VEHICLE CONVERTIBLE ROOF

BACKGROUND AND SUMMARY OF THE INVENTION

This invention relates generally to automotive vehicles and more particularly to a window system for use in an automotive vehicle convertible roof.

Soft top convertible roofs in automotive vehicles have commonly employed flexible, polyvinyl chloride back windows, which are also known as backlites. Flexible, polymeric backlites are often preferred over glass windows since they tend to maximize the size of the backlite opening thereby improving rear visibility. The flexible, polymeric material allows for an enlarged window opening since it is less expensive to manufacture, lighter weight and typically easier to stow as compared to rigid, glass windows. An example of such a flexible, polymeric backlite is disclosed in U.S. Pat. No. 5,271,655 entitled "Window Which can be Fastened in a Folding Top by Means of a Zipper, and a Process for Exchanging a Surface Section" which issued to Ball et al. on Dec. 21, 1993.

However, flexible, polymeric backlites often suffer from undesired permanent kinking, distortion or wrinkling when stowed or fully retracted. This can lead to poor window aesthetics and premature cracking of the backlite during use.

In accordance with the present invention, a preferred embodiment of an apparatus for use in automotive vehicle convertible roofs includes an elongated tensioning member being disposed adjacent to an edge of a window. In a further aspect of the present invention, at least a portion of the tensioning member is disposed in an elastomeric sealing member. In yet a further aspect of the present invention, a pair of resilient tensioning members are disposed adjacent to top and bottom edges of a backlite for deterring crosscar folding of the backlite while allowing fore and aft folding of the backlite when retracted. In still another aspect of the present invention, a first end of an elastic strap is attached to a movable roof bow while an opposite end is attached to the roof covering material adjacent to a corner of the backlite.

The backlite system of the present invention is advantageous over conventional devices since the present invention tensioning members encourage the upper and lower sections of the backlite to stay tensioned or taut during folding thereby deterring kinking, distortion or wrinkling. In addition, it has been found that the elastic straps of the present invention apply a diagonal tensioning load to the backlite to further cause the backlite to remain taut while being folded. Furthermore, the present invention backlite system is aesthetically pleasing by hiding the tensioning members from view while providing an easy to assemble, low cost and lightweight backlite tensioning assembly. The present invention provides superior tensioning performance while greatly enhancing the durability and quality of a flexible backlite. Additional advantages and features of the present invention will become apparent from the following description and appended claims, taken in conjunction with the accompanying drawings.

BRIEF DESCRIPTION OF THE DRAWINGS

FIG. 1 is a perspective view showing the preferred embodiment of a backlite system employed in an automotive vehicle convertible roof of the present invention;

FIG. 2 is a rear elevational view showing the preferred embodiment of the backlite system;

DETAILED DESCRIPTION OF THE PREFERRED EMBODIMENT

Figure 4:
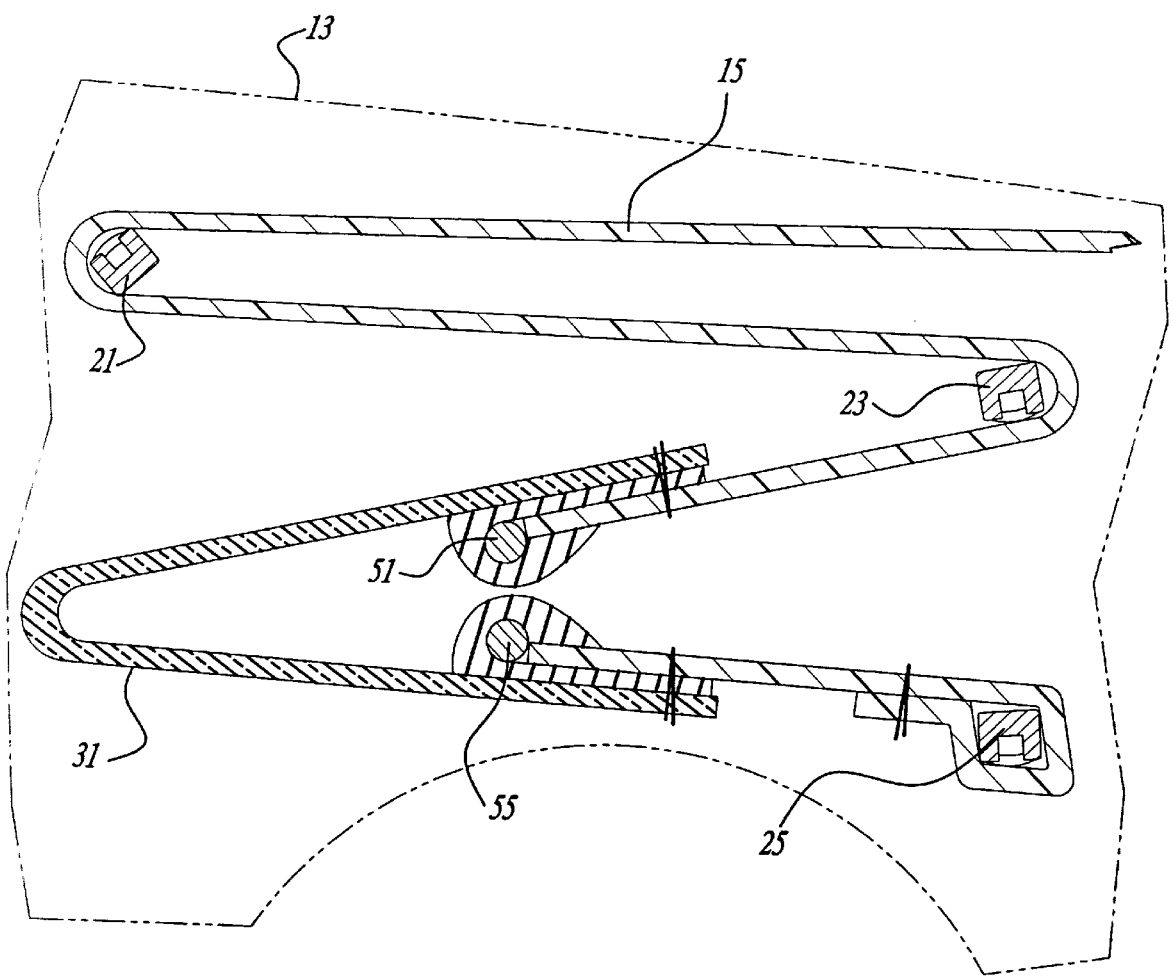
FIG. 4 is a fragmentary cross sectional view, also taken along line 3—3 of FIG. 2, showing the preferred embodiment of the backlite system disposed in a fully retracted and stowed position.

FIGS. 1 and 2 show the preferred embodiment of a backlite system employed in a convertible roof assembly 11 of an automotive vehicle 13 of the present invention. Convertible roof assembly 11 includes a linkage or top stack mechanism covered by a pliable fabric top covering 15. More specifically, the linkage assembly includes a number one roof bow 17, a number two roof bow 19, a number three roof bow 21, a number four roof bow 23, and a number five or rearmost roof bow 25. Convertible roof assembly 11 is movable from a raised and extended position covering the vehicle's passenger compartment, as is shown in FIG. 1, to a fully retracted and stowed position within a boot or storage area, as is shown in FIG. 4.

Figure 3:
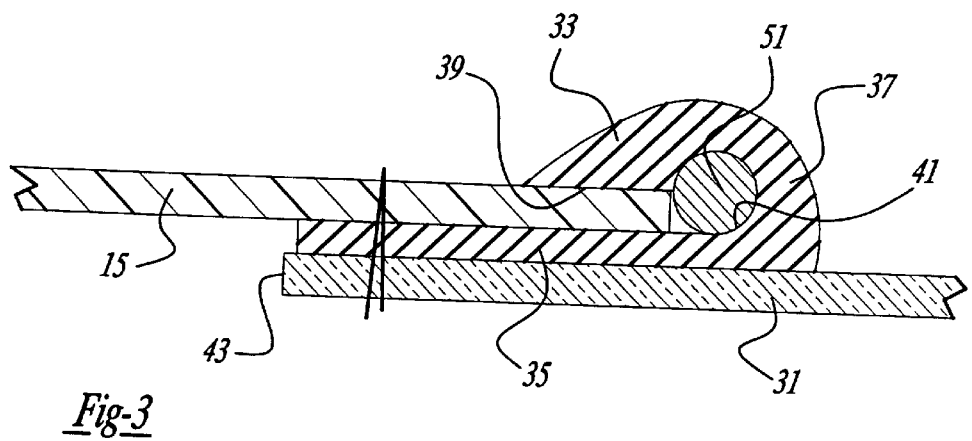
FIG. 3 is an enlarged cross sectional view, taken along line 3—3 of FIG. 2, showing the preferred embodiment of the backlite system.

Referring now to FIGS. 1–3, a flexible backlite window 31 is attached to a rear panel of fabric covering 15 by way of an extruded sealing profile 33. Backlite 31 is preferably made from a sheet of polyvinyl chloride polymer. Sealing profile 33 is preferably extruded from a synthetic elastomeric polymer, such as Santoprene which can be purchased from Monsanto Co. Sealing profile 33 has a generally C-like cross sectional shape defined by a flat leg 35 and a rounded section 37. An access slot 39 and circular cross sectionally shaped cavity 41 are also disposed in sealing profile 33. Backlite 31 is dielectrically bonded or sewn to leg 35 of sealing profile 33. A backlite opening edge of fabric covering 15 is inserted into slot 39 and then fabric covering 15 is dielectrically bonded or sewn to leg 35 of sealing profile 33. Sealing profile 33 has a uniform cross sectional shape and extends around the complete peripheral edge 43 of backlite 31.

An elongated, upper tensioning rod 51 is inserted into the corresponding cavity 41 of sealing profile 33 prior to insertion of fabric covering 15. Tensioning rod 51 is made from a spring stainless steel material having a circular cross sectional shape. Ends 53 of upper tensioning rod 51 terminate at the tangent to the radius at each upper corner of sealing profile 33. Similarly, a lower tensioning rod 55 is disposed in a lower portion of sealing profile 33 adjacent to a bottom edge of backlite 31. Both tensioning rods 51 and 55 project in a generally horizontal and crosscar direction. Tensioning rods 51 and 55 are somewhat resilient and springy.

As is shown in FIG. 1, a stretchable elastic strap 61 has a first end 63 riveted to number three bow 21. A second and opposite end 65 of elastic strap 61 is sewn to an inside surface of fabric covering 15 adjacent to an upper corner 67 of backlite 31. A second elastic strap is symmetrically disposed adjacent to the opposite corner of backlite 31. Alternately, elastic strap 61 may have its first end 63 fastened to number four bow 23.

As is shown in FIGS. 1, 2 and 4, tensioning rods 51 and 55 ensure that the upper and lower sections of backlite 31 remain tensioned and taut during folding to deter permanent creasing, kinking, distortion and wrinkling. Thus, tensioning rods 51 and 55 generally prevent undesired folding of backlite 31 in the crosscar direction while allowing backlite 31 to fold about its middle in a fore and aft direction when the top stack is retracted in an accordion manner. In addition, elastic straps 61 apply a diagonal tensioning or pulling load on backlite 31 to cause backlite tensioning and tautness while being folded.

Figure 5:
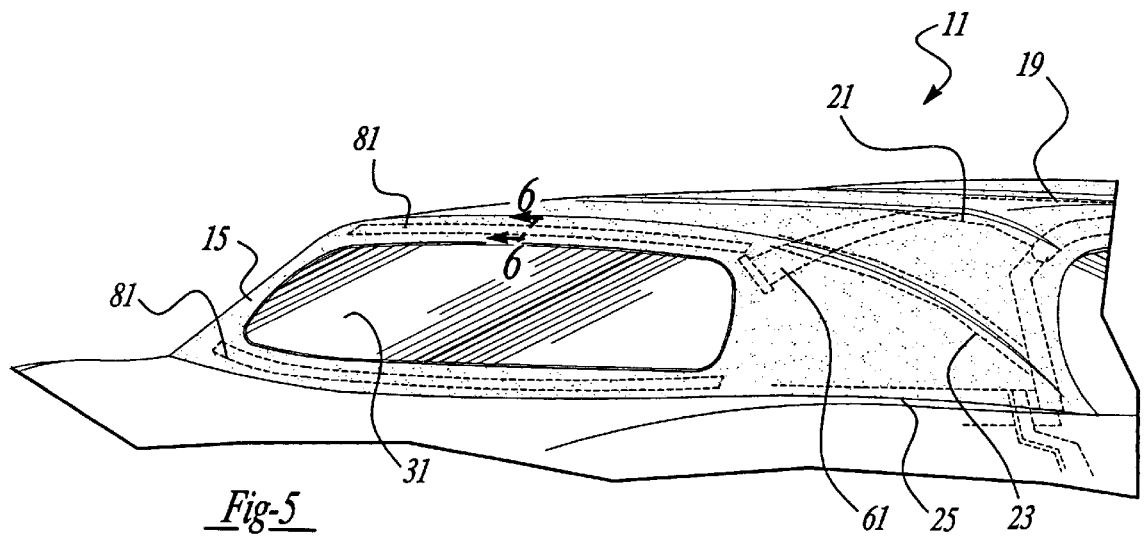
FIG. 5 is a perspective view showing an alternate embodiment of the backlite system.
Figure 6:
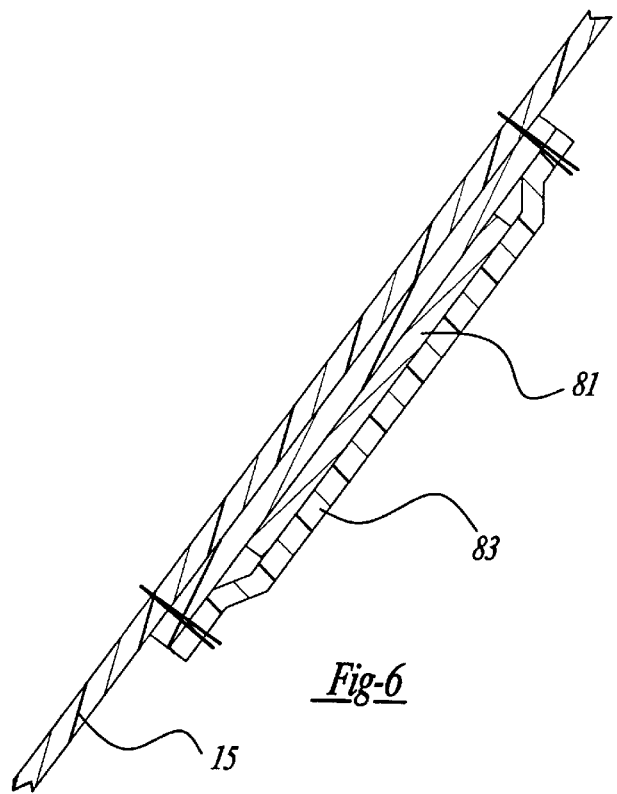
FIG. 6 is a cross sectional view, taken along line 6—6 of FIG. 5, showing the alternate embodiment of the backlite system.

An alternate embodiment of the backlite system of the present invention is illustrated in FIGS. 5 and 6. This alternate embodiment is similar to the preferred embodiment except that rectangularly cross sectionally shaped aluminum tensioning bars 81 are retained within fabric pockets 83 above and below upper and lower peripheral edges of backlite 31. The lower tensioning bar is longer in a crosscar direction than is the upper tensioning bar and extends slightly past bottom corners of the backlite. Pocket 83 consists of two layers of fabric sewn or dielectrically bonded to each other and to the inside surface of fabric covering 15. After insertion of tensioning bar 81, the ends of each pocket are sewn or bonded shut. For this embodiment, a conventional C-shaped sealing profile and zipper-type arrangement can be employed, such as that disclosed in U.S. Pat. No. 5,271,655.

While various embodiments of the backlite system of the present invention have been disclosed, it will be appreciated that various other constructions may be employed without departing from the present invention. For example, while the vertical peripheral edges of the disclosed backlite embodiments are shown free of a tensioning rod or bar, partial vertically extending side tensioning members may be employed as long as they allow for fore and aft folding of the backlite when stowed. Additionally, other fiberglass, polymeric or composite tensioning members may be used. It is also envisioned that various alternate top stack linkage mechanisms and roof bow arrangements can be incorporated with the tensioning member features of the present invention. Various materials have been disclosed in an exemplary fashion, however, other materials may of course be employed. It is intended by the following claims to cover these and any other departures from the disclosed embodiments which fall within the true spirit of this invention.

The invention claimed is:

1. An apparatus for use in a convertible automotive vehicle, said apparatus comprising:
   a soft top convertible roof movable from an extended position to a retracted position;
   a window attached to said convertible roof, said window being made from a flexible, polymeric material; and
   a first elongated tensioning member disposed adjacent to a first edge of said window, ends of said first tensioning member terminating substantially adjacent to corners of said window.

2. The apparatus of claim 1 wherein said window is a backlite.

3. The apparatus of claim 2 further comprising a second elongated tensioning member disposed adjacent to a second edge of said backlite substantially opposite from said first edge, said first and second tensioning members being elongated in substantially crosscar and horizontal directions whereby said tensioning members deter wrinkling in said crosscar direction while allowing said backlite to fold in a fore and aft direction.

4. An apparatus for use in a convertible automotive vehicle, said apparatus comprising;
   a soft top convertible roof movable from an extended position to a retracted position;
   a window attached to said convertible roof; a first elongated tensioning member located adjacent to a first edge of said window ends of said first tensioning member terminating substantially adjacent to corners of said window; and
   an elastomeric member located adjacent to said first edge of said window;
   at least a portion of said first tensioning member being located in said elastomeric member.

5. The apparatus of claim 4 wherein said first tensioning member is entirely disposed in said elastomeric member, and said elastomeric member seals said window to said convertible roof.

6. The apparatus of claim 5 wherein said first tensioning member is a resilient metallic rod having a substantially circular cross sectional shape and said elastomeric member is extruded so as to extend around an entire periphery of said window and said elastomeric member has an open slot for receiving an edge portion of said convertible roof.

7. The apparatus of claim 1 further comprising a pocket attached to a fabric covering of said convertible roof, said pocket extending substantially parallel to said first edge of said window, said first tensioning member being disposed in said pocket.

8. A window system for use with an automotive vehicle convertible roof, said system comprising:
   a flexible back window movable from an extended position to a folded retracted position;
   a first tensioning member disposed adjacent to an upper edge of said back window; and
   a second tensioning member disposed adjacent to a lower edge of said back window;
   whereby said back window is substantially prevented from folding in a crosscar direction by said tensioning members while being allowed to fold in a fore and aft direction.

9. The system of claim 8 further comprising an elastomeric member disposed adjacent to one of said edges of said window, at least a portion of said first tensioning member being disposed in said elastomeric member.

10. The system of claim 9 wherein said tensioning members are entirely disposed in said elastomeric member.

11. The system of claim 8 further comprising an elastomeric member extruded so as to extend around an entire periphery of said window, wherein said first tensioning member is a resilient metallic rod having a substantially circular cross sectional shape.

12. The system of claim 8 wherein said tensioning members have a solid rectangular cross sectional shape.

13. A convertible roof assembly for use in an automotive vehicle, said assembly comprising:
   a plurality of roof bows;
   a pliable covering movably supported by said plurality of roof bows;
   a flexible, polymeric backlite secured to said covering;
   a sealing member disposed at an intersection of said covering and said backlite along at least a first edge of said backlite; and
   a resilient rod disposed in said sealing member adjacent to said first edge of said backlite.

14. The assembly of claim 13 further comprising an elastic strap having a first end attached to one of said plurality of roof bows and having a second end attached to said covering adjacent to a corner of said backlite.

15. The assembly of claim 14 wherein said strap pulls said backlite in a diagonal direction.

16. The assembly of claim 13 wherein said rod has a substantially solid and circular cross sectional shape.

17. The assembly of claim 13 further comprising a second resilient rod being disposed in said sealing member.

18. The assembly of claim 13 wherein said covering and said backlite are fastened to said sealing member.

* * * * *

UNITED STATES PATENT AND TRADEMARK OFFICE
CERTIFICATE OF CORRECTION

PATENT NO. : 5,887,936
DATED : March 30, 1999
INVENTOR(S) : Lendell E. Cowsert

It is certified that error appears in the above-identified patent and that said Letters Patent is hereby corrected as shown below:

Column 4, line 2, ";" should be -- : --.

Column 4, line 5, begin new paragraph with "a first" ... .

Column 4, line 7, after "window" insert -- , --.

Column 6, line 2, delete "being".

Signed and Sealed this

Twenty-first Day of March, 2000

Attest:

Q. TODD DICKINSON

Attesting Officer

Commissioner of Patents and Trademarks